United States Patent
Tomita

(10) Patent No.: US 6,957,713 B2
(45) Date of Patent: Oct. 25, 2005

(54) STEERING ANGLE DETECTION DEVICE FOR ELECTRIC POWER STEERING APPARATUS

(75) Inventor: Akihiro Tomita, Okazaki (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 12 days.

(21) Appl. No.: 10/825,322

(22) Filed: Apr. 16, 2004

(65) Prior Publication Data

US 2004/0210366 A1 Oct. 21, 2004

(30) Foreign Application Priority Data

Apr. 16, 2003 (JP) .............................. 2003-111577

(51) Int. Cl.[7] ................................................ B62D 5/04
(52) U.S. Cl. .................... 180/446; 701/41; 73/862.326
(58) Field of Search .............................. 180/443, 444, 180/446; 701/41; 73/862.326, 862.325, 862.08, 73/862.328, 862.193

(56) References Cited

U.S. PATENT DOCUMENTS

| | | | |
|---|---|---|---|
| 4,621,327 A * | 11/1986 | Dolph et al. ................. 180/446 |
| 5,239,490 A * | 8/1993 | Masaki et al. ............... 180/446 |
| 5,259,473 A * | 11/1993 | Nishimoto ................... 180/446 |
| 5,271,474 A * | 12/1993 | Nishimoto et al. .......... 180/446 |
| 5,465,210 A * | 11/1995 | Walenty ....................... 180/446 |
| 5,687,811 A | 11/1997 | Shimizu |
| 2004/0020309 A1 * | 2/2004 | Nagase et al. .......... 73/862.339 |
| 2004/0188170 A1 * | 9/2004 | Asada .......................... 180/443 |
| 2004/0188172 A1 * | 9/2004 | Asada .......................... 180/446 |
| 2004/0210366 A1 * | 10/2004 | Tomito ......................... 701/41 |
| 2005/0016789 A1 * | 1/2005 | Asada .......................... 180/444 |
| 2005/0061087 A1 * | 3/2005 | Kichise et al. .......... 73/862.191 |
| 2005/0065686 A1 * | 3/2005 | Kohno et al. .................. 701/41 |
| 2005/0067210 A1 * | 3/2005 | Hayashi ....................... 180/272 |
| 2005/0093505 A1 * | 5/2005 | Kameya ....................... 318/805 |

FOREIGN PATENT DOCUMENTS

| | | |
|---|---|---|
| EP | 1 026 068 A2 | 8/2000 |
| EP | 1 291 264 A2 | 3/2003 |
| JP | 2001-194251 | 7/2001 |

* cited by examiner

*Primary Examiner*—Matthew Luby
(74) *Attorney, Agent, or Firm*—Oblon, Spivak, McClelland, Maier & Neustadt, P.C.

(57) ABSTRACT

In a steering angle detection device for an electric power steering apparatus, a steering wheel shaft rotation angle is derived by calculating a rotation angle signal which corresponds to a rotation angle of a steering wheel shaft within a single rotation, based upon detection signals of first and second resolvers which detect the rotation angle of the steering wheel shaft and which have different pole pair numbers. A third resolver detects, as a motor rotation angle, a rotation angle of an output shaft of an electric motor that imparts assistance force to an output member of a steering gear having a reduction ratio that varies in accordance with a steering angle of the steering wheel from a straight ahead position. A first derivative and a second derivative of the motor rotation angle with respect to the steering wheel shaft rotation angle are calculated, and a rotational direction and a rotation number of the steering wheel shaft from a neutral position are obtained based on the first derivative and a positive-negative sign of the second derivative. A steering angle of the steering wheel is then obtained from the rotation direction and the rotation number of the steering wheel shaft from the neutral position, and the steering wheel shaft rotation angle.

4 Claims, 7 Drawing Sheets

STEERING ANGLE DETECTION DEVICE FOR ELECTRIC POWER STEERING APPARATUS

INCORPORATION BY REFERENCE

The disclosure of Japanese Patent Application Number 2003-111577 filed on Apr. 16, 2003 including the specification, drawings and abstract is incorporated herein by reference in its entirety.

BACKGROUND OF THE INVENTION

1. Field of the Invention

The present invention relates to a steering angle detection device for an electric power steering apparatus.

2. Description of the Related Art

Japanese Patent Publication Laid-Open No. 2001-194251 (page 3 and FIGS. 2 and 3) discloses a steering angle detection device for an electric power steering apparatus. The electric power steering apparatus is configured such that a first shaft of a torque sensor that detects a steering torque applied to a steering wheel is coupled to a steering wheel shaft connected to a steering wheel, and a second shaft of the torque sensor, which is coupled to the first shaft via a torsion bar, is coupled to a steered vehicle wheel via a steering gear. Rotation angles of the first and second shafts are detected by first and second resolvers, and the steering torque is derived from the rotation difference of the first and second shafts that is detected by the first and second resolvers. An electric motor then applies assistance force that is derived from the steering torque to the steering gear. The steering angle detection device for this electric power steering apparatus is configured such that a steering angle of the steering wheel that can rotate multiple times to the left or right from a straight ahead position is detected based on detection signals from the first and second resolvers, and a multiple-turn absolute detection unit provided on the second shaft.

However, in the steering angle detection device for the electric power steering apparatus described above, the multiple-turn absolute detection unit, which detects a rotation number of the steering wheel shaft coupled to the steering wheel from the straight ahead position, has to be provided additionally. This causes problems related to cost increase and the need for installation space.

SUMMARY OF THE INVENTION

The present invention has been conceived of in order to address the related conventional problems. It is an object of the present invention to detect a steering angle of a steering wheel that can rotate multiple times by utilizing already provided resolvers in an electric power steering apparatus.

According to a configuration of a first aspect of the present invention, a steering angle detection device is provided for an electric power steering apparatus in which a steering wheel shaft coupled to a steering wheel, this steering wheel being capable of multiple rotations to the left and right, respectively, from a straight ahead position, is coupled to a steered vehicle wheel via a steering gear having a reduction ratio that varies in accordance with a steering angle of the steering wheel from the straight ahead position; and in which a transmission mechanism couples an electric motor that imparts assistance force corresponding to a steering torque to an output member of the steering gear. This steering angle detection device includes: a first resolver and a second resolver which detect a rotation angle of the steering wheel shaft and which have mutually different pole pair numbers; a third resolver that detects a motor rotation angle that is a rotation angle of an output shaft of the electric motor; a steering wheel shaft rotation angle calculation unit that calculates a steering wheel shaft rotation angle that is a rotation angle of the steering wheel shaft within a single rotation thereof, based upon respective detection signals from the first resolver and the second resolver; a differential calculation unit that calculates a first derivative and a second derivative of the motor rotation with respect to the steering wheel shaft rotation angle during rotation of the steering wheel shaft; a steering wheel shaft rotation number calculation unit that derives a rotation direction and a rotation number of the steering wheel shaft from a neutral position based on a positive-negative sign of the second derivative and the first derivative; and a steering angle calculation unit that calculates the steering angle of the steering wheel based on the rotation direction and the rotation number of the steering wheel shaft from the neutral position and the steering wheel shaft rotation angle.

Other aspects and advantage of the invention will become apparent from the following description, taken in conjunction with the accompanying drawings, illustrating by way of example the principles of the invention.

DETAILED DESCRIPTION OF THE PREFERRED EMBODIMENTS

Figure 1:
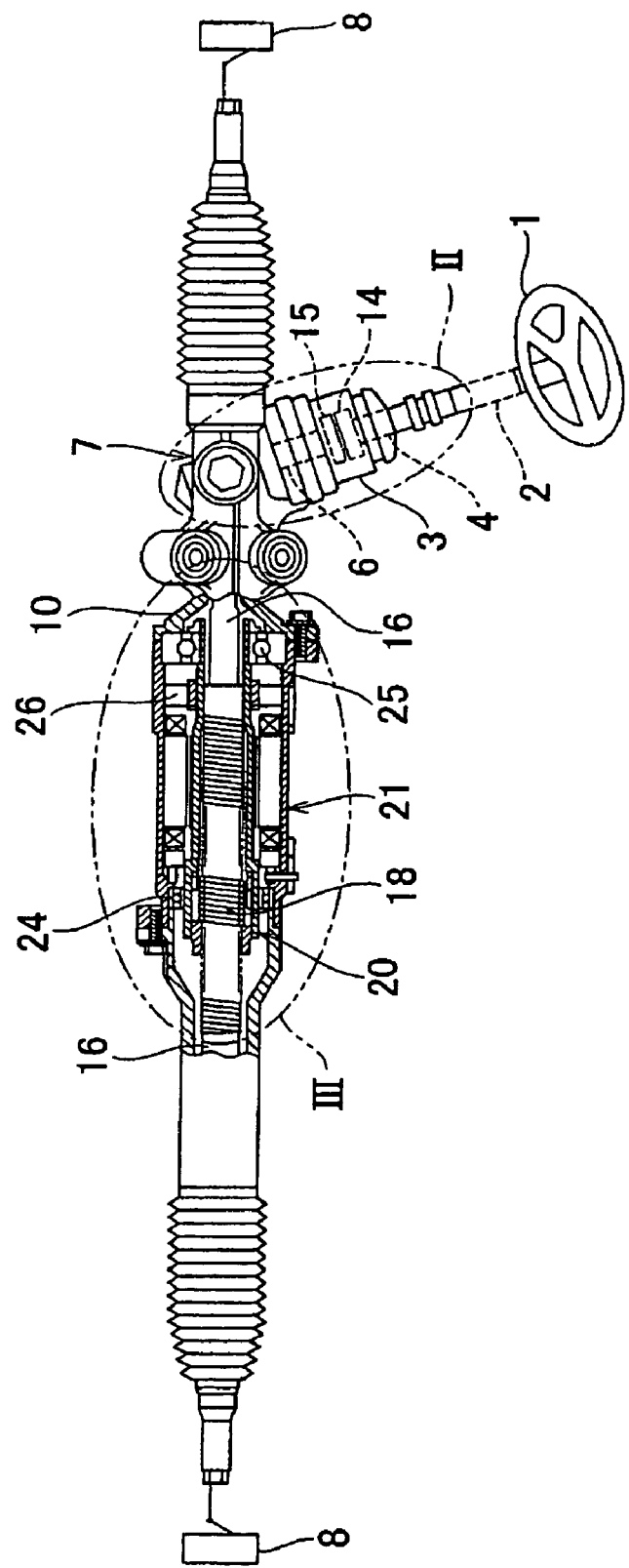
FIG. 1 shows a general configuration of an electric power steering apparatus.
Figure 2:
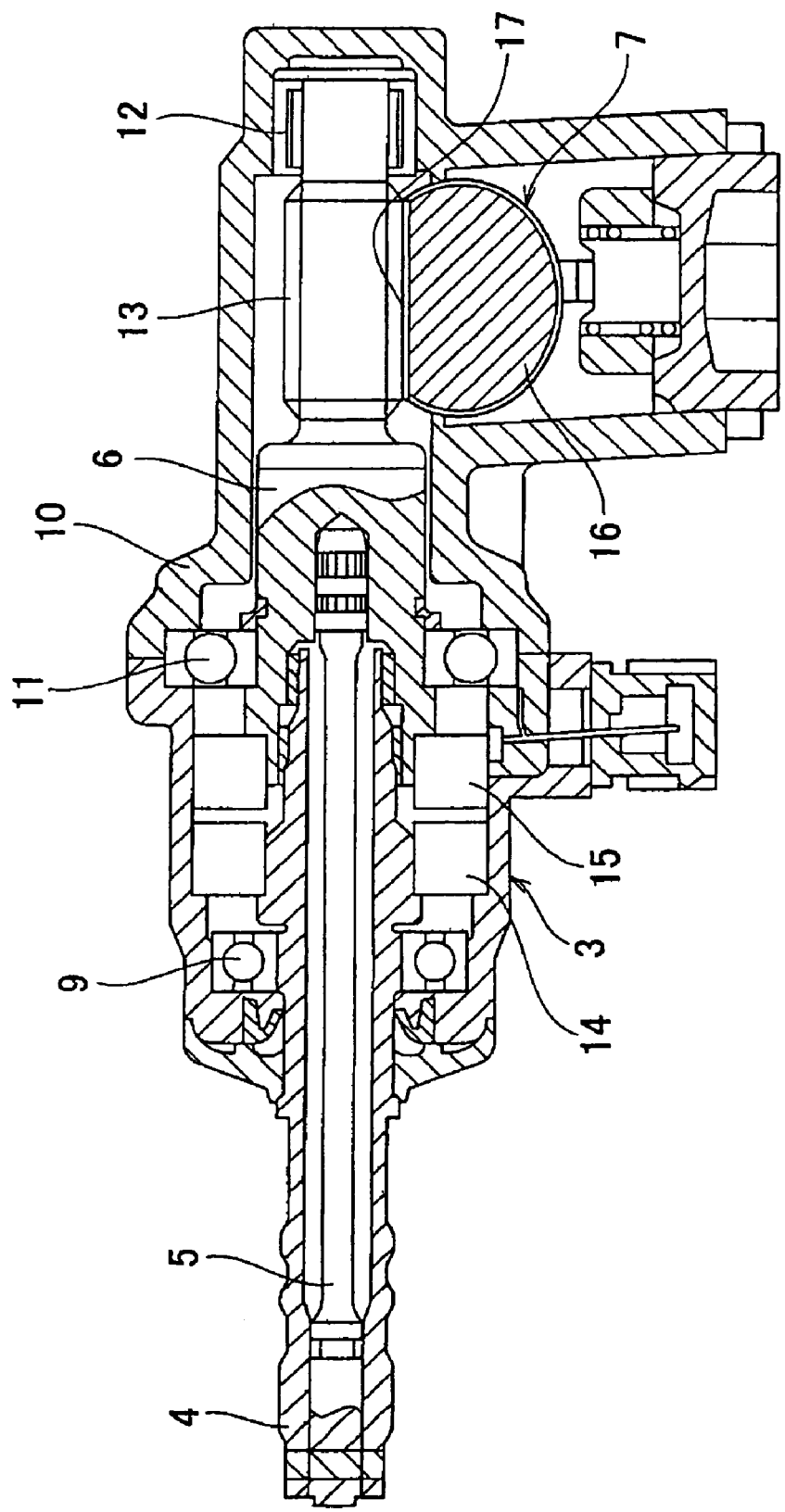
FIG. 2 is an enlarged cross sectional view of a portion II of FIG. 1.
Figure 3:
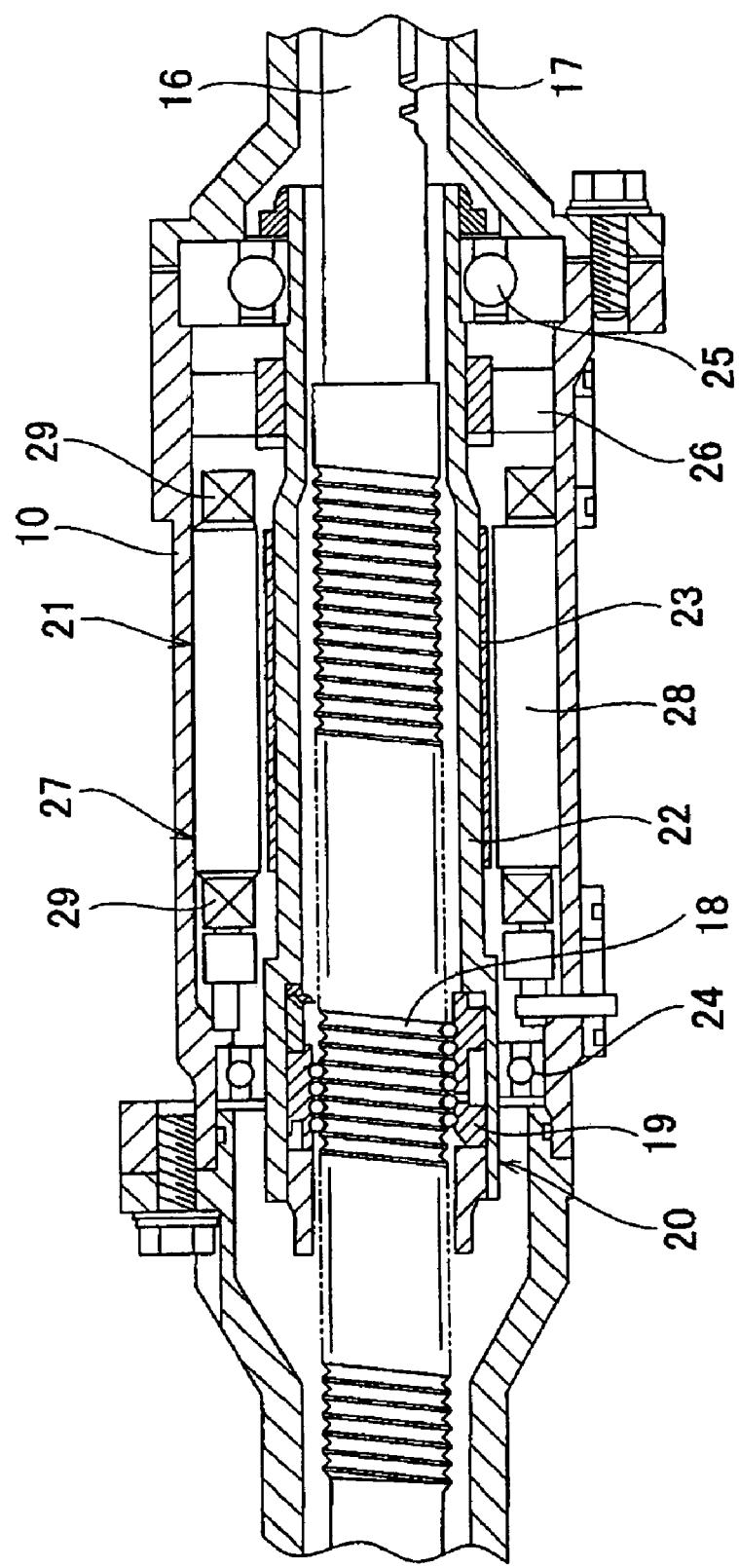
FIG. 3 is an enlarged cross sectional view of a portion III of FIG. 1.

Hereinafter, an embodiment of a steering angle detection device for an electric power steering apparatus of the present invention will be described with reference to the figures. In FIGS. 1 to 3, a steering wheel shaft 2, to which a steering wheel 1 is attached, is rotatably supported by a steering column (not shown). A torque sensor 3 detects a steering torque applied to the steering wheel 1; a first shaft 4 of the torque sensor 3 is spline engaged to the steering wheel shaft 2, and a second shaft 6 of the torque sensor 3 is coupled to the first shaft 4 by a torsion bar 5. This second shaft 6 is connected to steered vehicle wheels 8 via a variable ratio rack-and-pinion mechanism 7. The first shaft 4 has a central portion that is supported within a housing 10 by a bearing 9, and n end portion (lower end in FIG. 2) that is supported by an upper end portion of the second shaft 6 so as to be capable of relative rotation therewith. The upper end portion and a lower end portion of the second shaft 6 are rotatably supported within the housing 10 by bearings 11 and 12 such that the second shaft 6 is coaxial with the first shaft 4. A pinion 13 is provided in a central portion of the second shaft 6. A first resolver 14 and a second resolver 15 are respectively provided in a space between the first shaft 4 and the second shaft 6, and the housing 10. The first and second resolvers 14 and 15 detect respective rotation angles of the first shaft 4 and the second shaft 6. Since the torsion bar 5 is twisted in accordance with the steering torque applied to the steering wheel 1, the steering torque is detected based on a difference of the rotation angles of the first and second shafts 4 and 6 that are respectively detected by the first and second resolvers 14 and 15. A difference of the rotation angles of the first and second shafts 4 and 6 is slight, and the pole pair numbers of the first and second resolvers 14 and 15 are mutually different at 5 and 6, respectively. Accordingly, it is possible to detect a steering wheel shaft rotation angle ω that is the rotation angle of the steering wheel shaft 2 within a single rotation, based on detection signals of the first and second resolvers 14 and 15.

A rack shaft 16 which meshes with a pinion 13 is slidably supported by the housing 10 so as to constitute the variable ratio rack-and-pinion mechanism 7 which serves as a steering gear that has a reduction ratio that varies in accordance with the steering angle of the steering wheel 1 from the straight ahead position. The engagement relationship of a rack 17 provided on the rack shaft 16 and the pinion 13 is such that, the steering wheel 1 can be rotated a number of times from the straight ahead position toward the left or right, respectively (for example, rotation of two times is possible in the respective directions), and a specific stroke that is a first derivative obtained by differentiating a movement amount of the rack shaft 16 by the rotation angle of the pinion 13 is set to have a variable ratio that varies (for example, gradually increases) with movement to the left or right of the rack shaft 16 from a center position. Moreover, respective steered wheels 8 are connected via respective knuckle arms, ball joints and tie rods, not shown, to respective ends of the rack shaft 16 that protrude from the housing 10. Thus, the steered vehicle wheels 8 are turned by movement of the rack shaft 16 in an axial direction. Further, a ball screw mechanism 20 is configured from a ball screw 18 that is threaded at a central portion of the rack shaft 16 within the housing 10, and a nut 19 that is screwed onto the ball screw 18 via circulating balls, not shown; the rack shaft 16 is moved in the axial direction as a result of rotation of the nut 19. The ball screw mechanism 20 acts as a transmission mechanism that couples an electric motor 21 to an output member of the steering gear.

A rotor 28 of the electric motor 21 is configured such that a plurality of permanent magnets 23 are fixed at predetermined distances apart in a circular pattern on an external periphery surface of a cylindrically-shaped output shaft 22 that the rack shaft 16 passes through. The output shaft 22 is rotatably supported by bearings 24 and 25 within the housing 10, and the nut 19 is fitted to an internal periphery at one end thereof. A third resolver 26 is provided between the output shaft 22 and the housing 10, and detects a motor rotation angle γ of the output shaft 22. The output shaft 22 and the rack shaft 16 are coupled via the ball screw mechanism 20, and thus the movement amount of the rack shaft 16 in the axial direction is detected by detecting the rotation angle γ of the output shaft 22. A stator 27 is configured such that a core 28 formed from layers of silicon steel sheet made by blanking is shrink fitted within an internal periphery bole of the housing 10, and a coil 29 is wrapped around leg portions that are provided on the core 28 so as to protrude toward the center of the housing 10.

Figure 4:
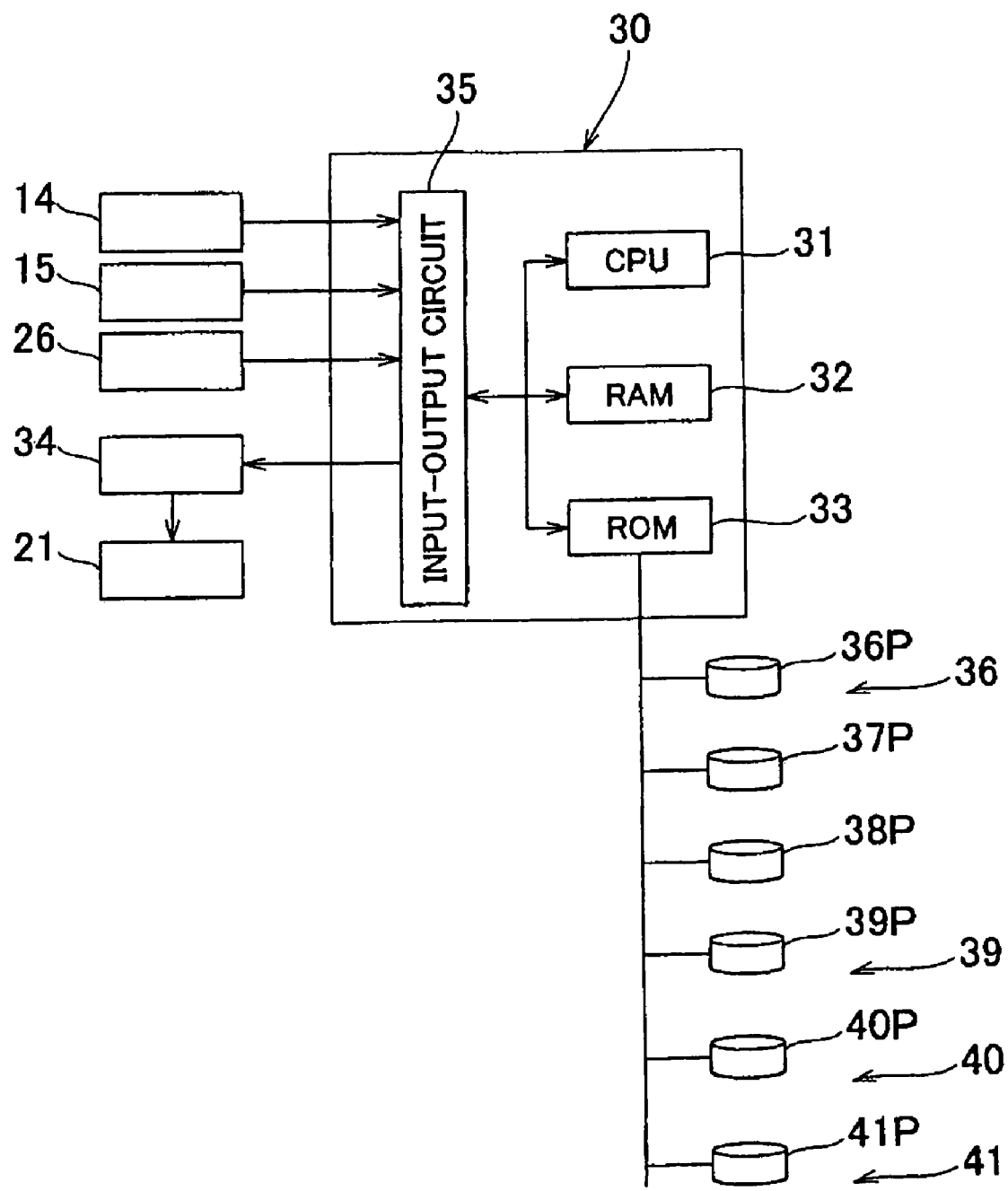
FIG. 4 is a block diagram of a control unit.

An electronic control unit 30, as shown in FIG. 4, is configured from a CPU 31 that executes various types of calculation processing; a ROM 33 in which a variety of programs executed by the CPU 31 are stored in advance; a RAM 32 on to which/from which the CPU 31 reads/writes data that is necessary during the calculation processing; and an input-output circuit 35 that receives the detection signals of the first, second and third resolvers 14, 15 and 26, and outputs a command current for driving the electric motor 21 to a motor drive circuit 34. A rotation angle calculation program 36P is stored as a steering wheel shaft rotation angle calculation unit 36 in the ROM 33. This rotation angle calculation program 36P calculates a rotation angle signal corresponding to the steering wheel shaft rotation angle ω that is the rotation angle within a single rotation of the steering wheel shaft 2, based upon the detection signals of the first and second resolvers 14 and 15 whose pole pair numbers are mutually different. This calculation processing is discussed in detail in the specification of Japanese Patent Application 2002-196131 (corresponding to International Patent Publication No. WO2004/005843A1), which is another application of the present applicant, and thus a detailed explanation will be omitted here. The steering wheel shaft 2 is coupled to the pinion 13, and thus the rotation angle of the pinion 13 is the same as the steering wheel shaft rotation angle ω.

Figure 5:
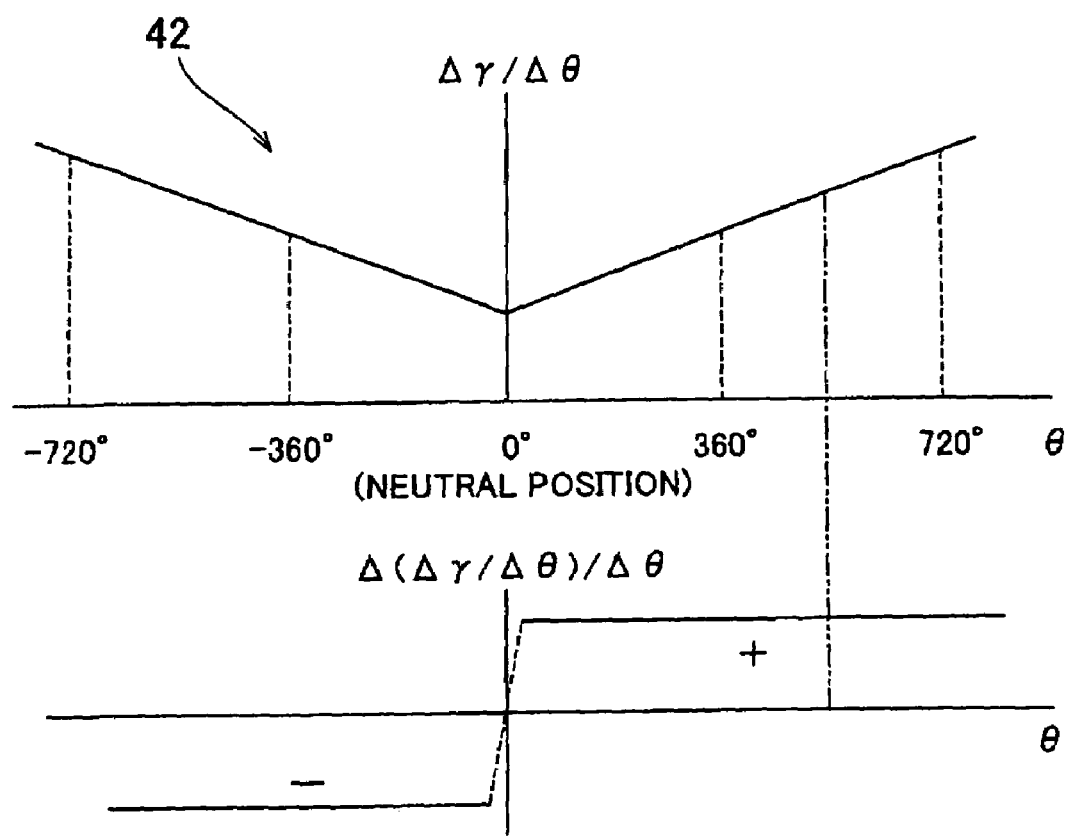
FIG. 5 is a map illustrating respective relationship between a first derivative and a second derivative obtained by differentiating a motor rotation angle by a steering angle, and the steering angle.

A steering torque calculation program 37P, a motor drive program 38P, a differential program 39P, a rotation number calculation program 40P, a steering angle calculation program 41P, and the like, are stored in the ROM 33 that is a memory unit. The steering torque calculation program 37P calculates the steering torque that is applied to the steering wheel 1, and a rotation direction thereof, by calculating the difference between the respective rotation angles of the first shaft 4 and the second shaft 6 of the torque sensor 3 based upon the detection signals of the first and second resolvers 14 and 15. The motor drive program 38P rotationally drives the electric motor 21 based upon the rotation direction of the steering wheel 1, the steering torque thereof, and the like, and imparts an assistance force in accordance with the steering torque to the rack shaft 16 via the ball screw mechanism 20. The differential program 39P, acting as a differential calculation unit 39, calculates the first derivative and a second derivative obtained by differentiating the motor rotation angle γ (which is the rotation angle of the output shaft 22 of the electric motor 21 detected by the third resolver 26 during rotation of the steering wheel shaft 2 caused by rotation of the steering wheel 1) by the steering wheel shaft rotation angle ω. The rotation number calculation program 40P, acting as a steering wheel shaft rotation number calculation unit 40, derives a rotation direction and a rotation number of the steering wheel shaft 2 from a neutral position based on a positive-negative sign of the second derivative and the first derivative. Further, the steering angle calculation program 41P, acting as a steering angle calculation unit 41, calculates a steering angle θ of the steering wheel 1 based on the rotation direction and the rotation number of the steering wheel shaft 2 from the neutral position, and the steering wheel shaft rotation angle ω. Moreover, the positive-negative sign of the second derivative obtained by differentiating the motor rotation angle γ by the steering angle θ for each steering angle θ of the steering wheel 1 and a design value or a measured value for the first derivative are stored in the ROM 33 as a map 42. In this embodiment, as shown in FIG. 5, the steering angle θ of the steering wheel 1 changes within a range of ±720 degrees, namely, two rotations of the steering wheel shaft 2 from the neutral position to either the positive or the negative side, respectively, and the specific stroke increases as the rack shaft 16 moves from the center position to the left or right. Therefore, the design value or the measured value of the first derivative obtained by differentiating the motor rotation angle γ by the steering angle θ for each steering angle θ increases along with increase of the steering angle θ within a positive range, and increases along with decrease of the steering angle θ within a negative range. Accordingly, the design value or the measured value of the second derivative obtained by differentiating the motor rotation angle γ by the steering angle θ is positive when the steering angle θ is in the positive range, and is negative when it is in the negative range. Meanwhile, a change ratio of the steering angle θ and the steering wheel shaft rotation angle ω is the same within a single rotation of the steering wheel shaft 2. Accordingly, the first derivative obtained by differentiating the motor rotation angle γ by the steering wheel shaft rotation angle ω and the first derivative obtained by differentiating the motor rotation angle γ by the steering angle θ are the same in a single rotation of the steering wheel shaft 2.

Figure 6:
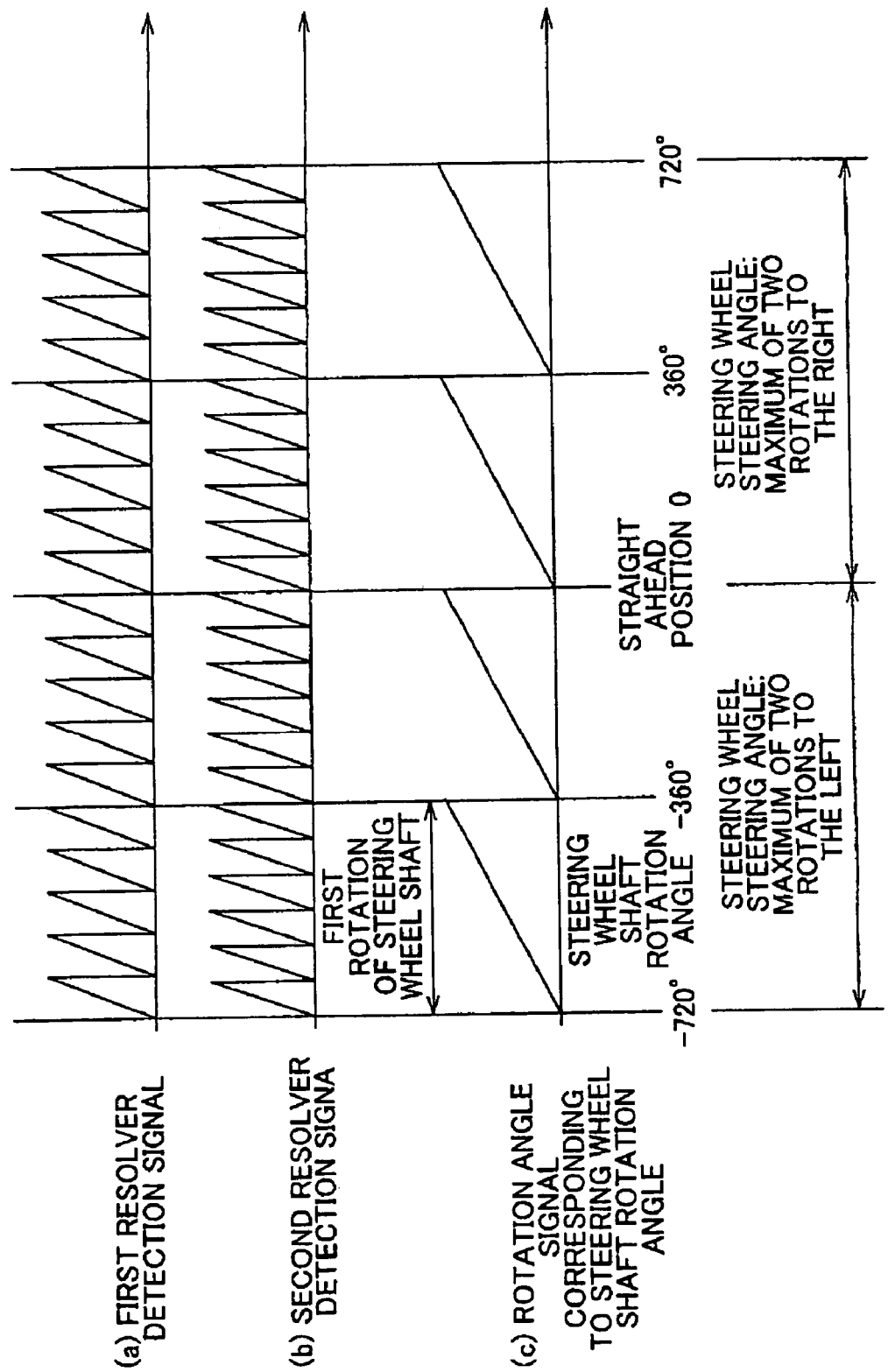
FIG. 6 shows respective relationships between a rotation angle within a single rotation of a steering wheel shaft, respective detection signals of a first and second resolver, and a rotation angle signal.

Next, an operation of the above described embodiment will be explained. When the steering wheel shaft 2 rotates as a result of rotation of the steering wheel 1, the first and second resolvers 14 and 15 output the respective detection signals, as shown in sections (a) and (b) of FIG. 6, having waveforms with five and six peaks, respectively, in accordance with the rotation angle of the steering wheel shaft 2 within a single rotation. The CPU 31 of the control unit 30 executes each of the programs at a specified time interval. When the rotation angle calculation program 36P is executed, as shown in section (c) of FIG. 6, the rotation angle signal corresponding to the steering wheel shaft rotation angle ω that is the rotation angle of the steering wheel shaft 2 within a single rotation is calculated, based upon the detection signals of the first and second resolvers 14 and 15. Then, the steering wheel shaft rotation angle ω is derived from the rotation angle signal. When the steering torque calculation program 37P is executed, the difference in the rotation angles of the first shaft 4 and the second shaft 6 of the torque sensor 3 is calculated based on the detection signals from the first and second resolvers 14 and 15, and then the steering torque applied to the steering wheel 1 and the rotation direction thereof are calculated. When the motor drive program 38P is executed, rotational drive of the electric motor 21 is executed based upon the rotation direction and the steering torque of the steering wheel 1, and the like. Then, the nut 19 is rotated by the output shaft 22, so as to move the ball screw 18. Accordingly, the rack shaft 16 is moved in the axial direction by an assistance force that corresponds with the steering torque, and the steered vehicle wheels 8 are turned. The rotation angle of the output shaft 22 of the electric motor 21 is detected by the third resolver 26.

Figure 7:
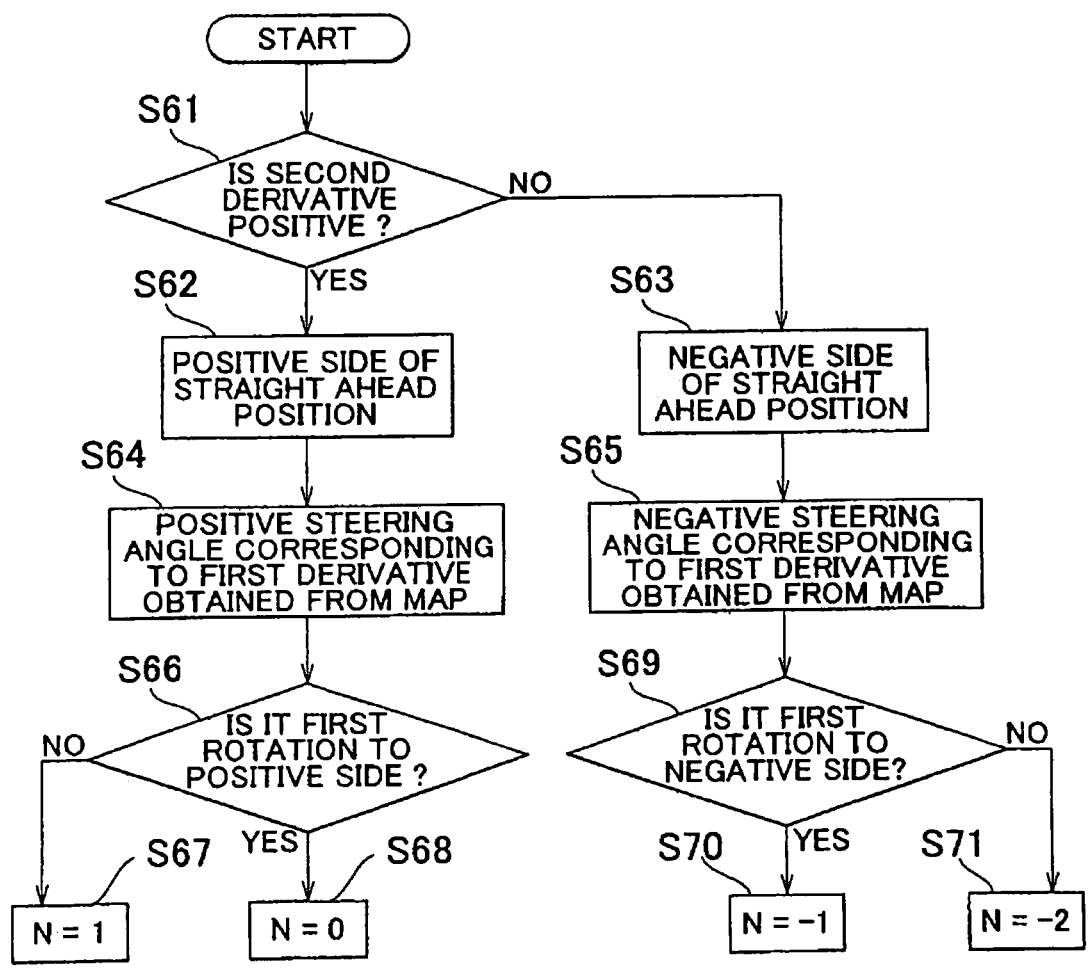
FIG. 7 shows a rotation number calculation program.

When the electric motor 21 is rotationally driven in accordance with the steering torque caused by rotation of the steering wheel shaft 2 resulting from rotation of the steering wheel 1, the rotation angle of the output shaft 22 is detected as the motor rotation angle γ by the third resolver 26. The differential program 39P calculates the first derivative and the second derivative by differentiating the motor rotation angle γ by the steering wheel shaft rotation angle ω. As shown in FIG. 7, the rotation number calculation program 40P determines whether the steering wheel 1 is turned toward the positive side or the negative side from the straight ahead position, based upon the positive-negative sign of the second derivative (steps S61 to S63); obtains the positive or negative steering angle θ corresponding to the first derivative based on the map 42 (steps S64 and S65); and derives a rotation number N for the rotation of the steering wheel shaft 2 from the neutral position. The rotation number N from the neutral position is defined to be "0" when the steering wheel shaft 2 is within the first rotation to the positive side, to be "1" within the second rotation to the positive side (steps S66 to S68), to be "−1" within the first rotation to the negative side, and to be "−2" within the second rotation to the negative side (steps S69 to S71). The steering angle calculation program 41P calculates the steering angle θ of the steering wheel 1 based upon the rotation number N for rotation of the steering wheel shaft 2 from the neutral position and the steering wheel shaft rotation angle ω, using the equation, $\theta = \omega + 360° \times N$. In this case, in order to inhibit the rotation number from being miscalculated by one rotation, when a absolute value of the difference between the calculated first derivative and a first derivative in the map 42 that corresponds to a steering angle θ of ±360° is equal to a predetermined value or less, it is preferable that the calculation of the steering angle θ is not executed, and instead, the calculated steering angle θ for the previous cycle is utilized in the various controls.

This steering angle detection device according to aforementioned embodiment utilizes the first and second resolvers which are already provided on the steering wheel shaft to detect the steering torque applied to the steering wheel, and utilizes the already provided third resolver to detect the rotation angle of the output shaft of the electric motor that imparts assistance force to the output member of the steering gear having the reduction ratio that varies in accordance with the steering angle. Therefore, it is possible to provide a steering angle detection device that can detect the steering angle of the steering wheel that is capable of rotating multiple times, is low cost, and requires small installation space in an electric power steering apparatus. Further, it is possible to easily detect the steering angle using a simple configuration that utilizes the already provided resolvers. Specifically, it is possible to accurately detect the steering angle of the steering wheel using a simple and low cost configuration that utilizes the already provided resolvers.

In the above described embodiment, the specific stroke is linearly increased along with movement of the rack shaft 16 to the left or right from the center position. However, the present invention may also be applied to art in which the specific stroke decreases along with movement thereof.

The present embodiments are to be considered as illustrative and not restrictive, and the invention is not to be limited to the detail given herein, but may be modified within the scope and equivalence of the appended claims.

What is claimed is:

1. A steering angle detection device for an electric power steering apparatus in which a steering wheel shaft coupled to a steering wheel, the steering wheel being capable of multiple rotations to left and right, respectively, from a straight ahead position, is coupled to a steered vehicle wheel via a steering gear having a reduction ratio that varies in accordance with a steering angle of the steering wheel from the straight ahead position, and in which a transmission mechanism couples an electric motor that imparts assistance force corresponding to a steering torque to an output member of the steering gear, comprising:

a first resolver and a second resolver which detect a rotation angle of the steering wheel shaft and which have mutually different pole pair numbers;

a third resolver that detects a motor rotation angle that is a rotation angle of an output shaft of the electric motor;

a steering wheel shaft rotation angle calculation unit that calculates a steering wheel shaft rotation angle that is a rotation angle of the steering wheel shaft within a single rotation thereof, based upon respective detection signals from the first resolver and the second resolver, a differential calculation unit that calculates a first derivative and a second derivative of the motor rotation angle with respect to the steering wheel shaft rotation angle during rotation of the steering wheel shaft;

a steering wheel shaft rotation number calculation unit that derives a rotation direction and a rotation number of the steering wheel shaft from a neutral position based on the first derivative and a positive-negative sign of the second derivative; and a steering angle calculation unit that calculates the steering angle of the steering wheel based on the rotation direction and the rotation number of the steering wheel shaft from the neutral position, and the steering wheel shaft rotation angle.

2. The steering angle detection device for an electric power steering apparatus according to claim 1, wherein the steering wheel shaft rotation number calculation unit stores one of a design value and a measurement value of the first derivative with respect to the steering angle of the steering wheel in a memory unit as one of a map and a calculation formula, and derives the rotation direction and the rotation number of the steering wheel shaft from the neutral position based on the first derivative and the positive-negative sign of the second derivative, using one of the map and the calculation formula.

3. The steering angle detection device for an electric power steering apparatus according to claim 1, wherein the first resolver and the second resolver detect a rotation angle of a first shaft of a torque sensor coupled to the steering wheel shaft, the second resolver detects a rotation angle of a second shaft of the torque sensor, the second shaft being coupled to the first shaft via a torsion bar, the steering gear is configured from a variable ratio rack-and-pinion mechanism in which a specific stroke that is a first derivative of a movement amount of a rack shaft with respect to a rotation angle of a pinion varies in accordance with movement of the rack shaft to left and right from a central position, the transmission mechanism is configured such that the output shaft of the electric motor is rotationally coupled to a nut that is screwed to a ball screw provided on the rack shaft, and the third resolver detects the rotation angle of the output shaft of the electric motor.

4. The steering angle detection device for an electric power steering apparatus according to claim 2, wherein the first resolver and the second resolver detect a rotation angle of a first shaft of a torque sensor coupled to the steering wheel shaft, the second resolver detects a rotation angle of a second shaft of the torque sensor, the second shaft being coupled to the first shaft via a torsion bar, the steering gear is configured from a variable ratio rack-and-pinion mechanism in which a specific stroke that is a first derivative of a movement amount of a rack shaft with respect to a rotation angle of a pinion varies in accordance with movement of the rack shaft to left and right from a central position, the transmission mechanism is configured such that the output shaft of the electric motor is rotationally coupled to a nut that is screwed to a ball screw provided on the rack shaft, and the third resolver detects the rotation angle of the output shaft of the electric motor.

* * * * *